(12) United States Patent
Klassen

(10) Patent No.: US 6,445,463 B1
(45) Date of Patent: Sep. 3, 2002

(54) IMAGE PROCESSING METHOD TO REDUCE MARKING MATERIAL COVERAGE IN PRINTING PROCESSES

(75) Inventor: R. Victor Klassen, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/232,641

(22) Filed: Jan. 19, 1999

(51) Int. Cl.[7] .............................................. G06K 15/00
(52) U.S. Cl. ........................................ 358/1.9; 358/1.7
(58) Field of Search ........................ 358/1.1–1.9, 1.18, 358/526, 4.56, 4.66; 347/24, 43, 78; 382/167

(56) References Cited

U.S. PATENT DOCUMENTS

| | | | |
|---|---|---|---|
| 4,930,018 A | * 5/1990 | Chan et al. ................. | 358/298 |
| 4,999,646 A | * 3/1991 | Trask ........................... | 347/41 |
| 5,237,344 A | * 8/1993 | Tasaki et al. .................. | 347/9 |
| 5,515,479 A | * 5/1996 | Klassen ....................... | 358/1.9 |
| 5,519,815 A | 5/1996 | Klassen ....................... | 358/1.9 |
| 5,563,985 A | * 10/1996 | Klassen et al. ............... | 358/1.9 |
| 5,635,967 A | * 6/1997 | Klassen ....................... | 347/43 |
| 5,649,071 A | * 7/1997 | Klassen et al. ............... | 358/1.9 |

\* cited by examiner

*Primary Examiner*—Gabriel Garcia
(74) *Attorney, Agent, or Firm*—Oliff & Berridge, PLC

(57) ABSTRACT

A method for processing a color image for printing reduces an amount of marking material used in the printed image. The color image includes multiple separations, including at least one non-black color separation and a black color separation, each defined by a bitmap of single bit pixels each having a pixel value and arranged in an array of scan lines. The method includes the steps of, for each separation bitmap, measuring a marking material coverage value over a given area within the image; summing the marking material coverage of each separation bitmap to determine measured marking material coverage; comparing desired marking material coverage with measured total marking material coverage to derive an ON/OFF ratio, where the ON/OFF ratio represents a number of pixels to be turned OFF, compared to the number of pixels in a separation; setting a number of pixels to OFF in the non-black color separation bitmaps, in a larger number of pixels in said separation, in accordance with the turn OFF ratio; retaining an ON/OFF state of all of the pixels in the black color separation irrespective of the ON/OFF ratio; and outputting the separation bitmaps to a print controller. The method provides high quality printed images without causing an undesired color shift in the image due to the coverage reduction process.

21 Claims, 6 Drawing Sheets

IMAGE PROCESSING METHOD TO REDUCE MARKING MATERIAL COVERAGE IN PRINTING PROCESSES

BACKGROUND OF THE INVENTION

1. Field of Invention

This invention relates to an image processing method for reducing the amount of marking material required to print a colored image, to avoid problems common to the use of excessive amounts of ink. In particular, this invention relates to an image processing method in which the color separations of an image (such as cyan, magenta and yellow) are processed through a coverage reduction process, while the black color separation is passed unchanged.

2. Description of Related Art

Full color printing has become a desired goal of office, as well as home, products. One type of full color printer that has significant potential for fulfilling such a goal is the ink jet printer, due primarily to its low purchase costs combined with its high quality output. In one common design of such printers, a reservoir of liquid ink is connected to an ink output orifice via a capillary tube. In the tube, a heater element is provided, responsive to an on/off or binary printing signal. When printing is required and a printing signal is directed to the heater element, the heater element rapidly heats ink in the capillary tube adjacent thereto to a gaseous state, producing a pressure differential that expels a droplet of ink from the orifice, directing the droplet to a sheet of receiving material, such as paper. Color printing is accomplished by providing multiple layers or separations of ink on the page. Commonly, colors are provided by subtractive combinations of cyan, magenta and yellow inks. To print black, a combination of equal amounts of cyan, magenta and yellow is printed, or a fourth black ink is used as a substitute. Undercolor removal, a well known process in the printing arts, can be used to print a single layer of black ink as a substitute for the combination of equal amounts of cyan, magenta and yellow. For a fuller discussion of under color removal and its application to electronically derived or created images, reference is made to J. A. C. Yule, Principles of Color Reproduction, (John Wiley & Sons, Inc., New York, 1967), pages 294–327. Other full color printing processes may use dry powder or liquid toners.

A problem of ink jet printers is that the liquid inks used have a finite drying time, which tends to be somewhat longer than desirable. Further, the drying time of any particular area is at least partly a function of the amount of ink deposited on that area. That is, as the amount of ink deposited in a given area increases, the drying time of the ink in that area also generally increases. While satisfactory drying times are possible with black-only or single separation printing, once multiple separations are required, the large amount of liquid on the page causes the problems of ink puddling or pooling, bleeding to adjacent image areas, and flow through to the back side of the receiving material. Paper cockle is also a problem due to saturation of the paper receiving material and subsequent rapid drying. Particularly, problems are noted in the printed image at high ink coverage areas, and high coverage areas where high contrast image edges occur. While certain materials variations, such as selection of different inks or the use of special papers, may resolve some of these problems, each brings its own distinct problems to the process. While special treated papers optimized for ink jet use are possible, plain papers are preferred from cost and convenience standpoints.

Using one available set of materials, a maximum ink coverage of about 150% is required for printing without artifacts resulting from too much ink. As used herein, ink coverage refers to the number of ON pixels in a region for all the separations, divided by the total number of pixels in the region in one separation. Without undercolor removal, a typical full color image may require ink coverage in the range of 200–300%. With undercolor removal, maximum ink coverage may be down to 200%, but no lower. Additionally, it would be highly desirable for the process to operate irrespective of image content, or on the separation binary bitmaps without further image information.

While ink jet printing has a notable problem with the case of high ink coverage, other printing processes that operate on a pixel by pixel basis also have problems with excessive marking material. Notably, electrophotographic printing methods using a pixel by pixel printing process for forming a latent image for development by dry or liquid toner marking materials, can suffer from excessive marking material, evidenced by sheet cockling, and curling caused by differential shrinkage of toner and paper in the printing process.

U.S. Pat. No. 4,930,018 to Chan et al. teaches the reduction of paper cockle and graininess of ink jet prints. Printing of a given scan line occurs multiple times, with three different dye loadings, with pixels requiring the highest dye loading printed on one pass, pixels requiring an intermediate dye loading printed on another pass, and pixels requiring the lowest dye loading on another pass. The method takes as input continuous tone RGB (red-green-blue) images and performs RGB-CMYK (cyan-magenta-yellow key or black) conversion with full under color removal. As understood, printing is performed at half resolution, so that "pixels" in the input image correspond to 2×2 blocks in the output image. The image data is first error diffused from 8 bits per pixel per separation to 4 bits per pixel per separation. Then, for each pixel, a count of up to 4 drops of each dye loading is computed, for each separation. There are multiple choices, ranked in order of total ink coverage. If the highest coverage choice exceeds the maximum allowable coverage, the separation with highest coverage is changed to use a lower coverage value for the same gray level, if possible. If it is not possible to stay at the same gray level, the gray level for that separation is dropped by one, and the error passed on to neighbors. The process iterates until the total ink coverage is as low as required. Pixels within the 2×2 block are assigned values (0 or 1) by proceeding around the block in clockwise order, and filling in pixels in order. First, the high dye load pixels are turned on, then the medium, then the low. Within each dye loading group, first black is turned on, until there are no more black pixels of that dye loading, then the next pixels in the cycle are turned on, until there are no more cyan required, then magenta, and yellow, and then the next dye load group. By maximizing ink coverage and using multiple dye loadings, they reduce the noisiness of the image, and by maintaining the total ink coverage within known limits, they prevent the many problems associated with excessive ink.

U.S. Pat. No. 4,999,646 to Trask teaches limiting coverage to 100% coverage (by the above definition of coverage), or perhaps between 100 and 200% coverage (if 100% corresponds exactly to no white spaces on a page), owing to the circular shape and overlap of print dots. Coverage is limited by using 2×2 super pixels and assigning each one drop per pixel in a combination that depends on the color required. Assuming one bit per separation input with full undercolor removal, there are eight possible colors that could be(requested (including white). In order to reduce patterning due to the multiple swaths, two passes are used, each of a checkerboard pattern of pixels (the two passes being offset to provide full coverage). The two pass process allows ink to dry between passes.

U.S. Pat. No. 5,237,344 to Tasaki et al. describe a method for reducing the amount of ink printed to 50%, 75% or 66%. The method uses fixed patterns of turn-off locations (e.g., a checkerboard for 50%) and selects the pattern based on the printing mode (reverse character mode, block graphic mode or normal character mode), the character selected, and possibly the relative humidity. Apparently, the method is designed for single color (black) printing: if it were used for multiple separation (e.g., red formed from yellow and magenta) printing, both separations would be turned off in the same place, resulting in more obvious patterns. The small set of fixed turn-off patterns makes the method very sensitive to line angle, as lines at some angles will have more pixels turned off than others. Also the method is only useful for characters from a built-in font, including graphic characters; arbitrary fonts and shapes, such as are requested in documents created using industry standard page description languages, such as PCL or PostScript, cannot be handled in this way.

U.S. Pat. No. 5,515,479 to Klassen, the entire disclosure of which is incorporated herein by reference, discloses a coverage reduction method for processing images for printing. The method includes the steps of, for each separation, making a pixel level determination of marking material coverage, based on the number of pixels within a given area that are turned on. If a determination is made that too much marking material will be placed within the given area, a fraction of pixels in the area are turned off to reduce the amount of marking material that will be used for the given area. The method uses a processing order through each given area to prevent artifacts from occurring in the pixel reduction step, which tends to randomize the turn off effect. Additionally, in the disclosed method, the results of the determination are compared for each separation, to determine that the turnoff result allows at least one corresponding pixel among each of the separations to be turned on.

Other coverage reduction methods are also described in U.S. Pat. Nos. 5,649,071, 5,635,967, 5,563,985, and 5,519,815, the entire disclosures of which are incorporated herein by reference. U.S. Pat. No. 5,649,071 to Klassen et al. discloses a method of processing images preparatory to printing in a color printer adapted to printing serial color separations, that when superposed form the final color image. In the disclosed method, separation color images are received for printing defined by continuous tone separation signals, which are color corrected and halftoned preparatory to printing the color image. The received continuous tone separation image signals are used to derive an estimate of marking material coverage. The marking material coverage estimate is subsequently used in association with random number generation to turn OFF otherwise ON pixels in each separation as the separation is printed for the reduction of marking material coverage.

U.S. Pat. No. 5,635,967 to Klassen discloses a method and apparatus for reducing marking material coverage in reproduction of edges in a halftoned image. The method includes the steps of: a) detecting edges in the image using edge filtering; and b) reducing marking material coverage at the detected edges. Interseparation correlation may also be provided, for the purpose of ascertaining whether a detected edge is against a white or no colorant region, in which circumstance, marking material coverage is not reduced. The patent further describes the reduction of marking material coverage at the detected edges in proportion to the overall coverage in the image region, taking into account the kind of colors (primary or secondary) forming the edge.

U.S. Pat. No. 5,563,985 to Klassen et al. discloses a method for processing images for printing coverage reduced images. The method includes the steps, for each separation, of making a pixel level determination of marking material coverage, based on the number of pixels within a given area that are turned on. If a determination is made that too much marking material will be placed within the given area, a random number function is used to turn off a fraction of pixels in the area to reduce the amount of marking material that will be used for the given area. To prevent artifacts from occurring in the pixel reduction step, a processing order through each given area is used that tends to randomize the turn off effect. Additionally, the results of the determination are compared for each separation, to determine that the turnoff result allows at least one corresponding pixel among each of the separations to be turned ON.

Finally, U.S. Pat. No. 5,519,815 to Klassen discloses a method and device for processing color images preparatory to printing to effect coverage reduction. The method of reducing marking material coverage in text and line art areas of secondary colors includes the steps of: a) determining locations of text and line art color pixels having excessive marking material coverage; b) upon determining the locations of color pixels having excessive marking material coverage, processing separation pixels to turn OFF a predetermined portion of the separation pixels corresponding to color pixels having excessive marking material coverage; and c) to prevent artifacts from occurring in the pixel reduction step, processing a given area of separation pixels in an order which tends to randomize the turn OFF effect.

SUMMARY OF THE INVENTION

Despite these various coverage reduction techniques, a need exists for improved coverage reduction processes that provide high quality printed images with little image degradation.

In this respect, the present inventor has discovered that when all of the color separations are processed through a coverage reduction process, image shifts may occur, leading to reduced image quality. The appearance change occurs largely in an effect of producing less saturated or "duller" looking copy. However, the inventors unexpectedly discovered that if the black color separation is retained unchanged, while the other color separations (such as cyan, magenta and yellow) are coverage reduction processed, a resultant image is obtained that does not suffer from such color shift problems, and which more closely matches the color scheme of the original image.

Thus, in embodiments of this invention, the present invention provides a method for processing a color image for printing to reduce an amount of marking material used therefor, the color image comprised of multiple separations, comprising at least one non-black color separation and a black color separation, each defined by a bitmap of single bit pixels each having a pixel value and arranged in an array of scan lines. The method generally comprises the steps of:

for each separation bitmap, measuring a marking material coverage value over a given area within the image;

summing the marking material coverage of each separation bitmap to determine measured marking material coverage;

comparing desired marking material coverage with measured total marking material coverage to derive an ON/OFF ratio, where the ON/OFF ratio represents a number of pixels to be turned OFF, irrespective of their pixel value, compared to the number of pixels initially ON in a separation;

setting a number of pixels to OFF in the non-black color separation bitmaps, in a larger number of pixels in said separation, in accordance with the turn OFF ratio;

retaining an ON/OFF state of all of the pixels in the black color separation irrespective of the ON/OFF ratio; and outputting the separation bitmaps to a print controller.

The coverage reduction method of the present invention can be applied to ink jet printers, as well as to other printers that print an image on a pixel-by-pixel basis.

The present invention also provides a device for processing a color image, which device effects coverage reduction of the image.

BRIEF DESCRIPTION OF THE DRAWINGS

These and other advantages and features of this invention will be apparent from the following, especially when considered with the accompanying drawings, in which.

DETAILED DESCRIPTION OF PREFERRED EMBODIMENTS

Figure 1:
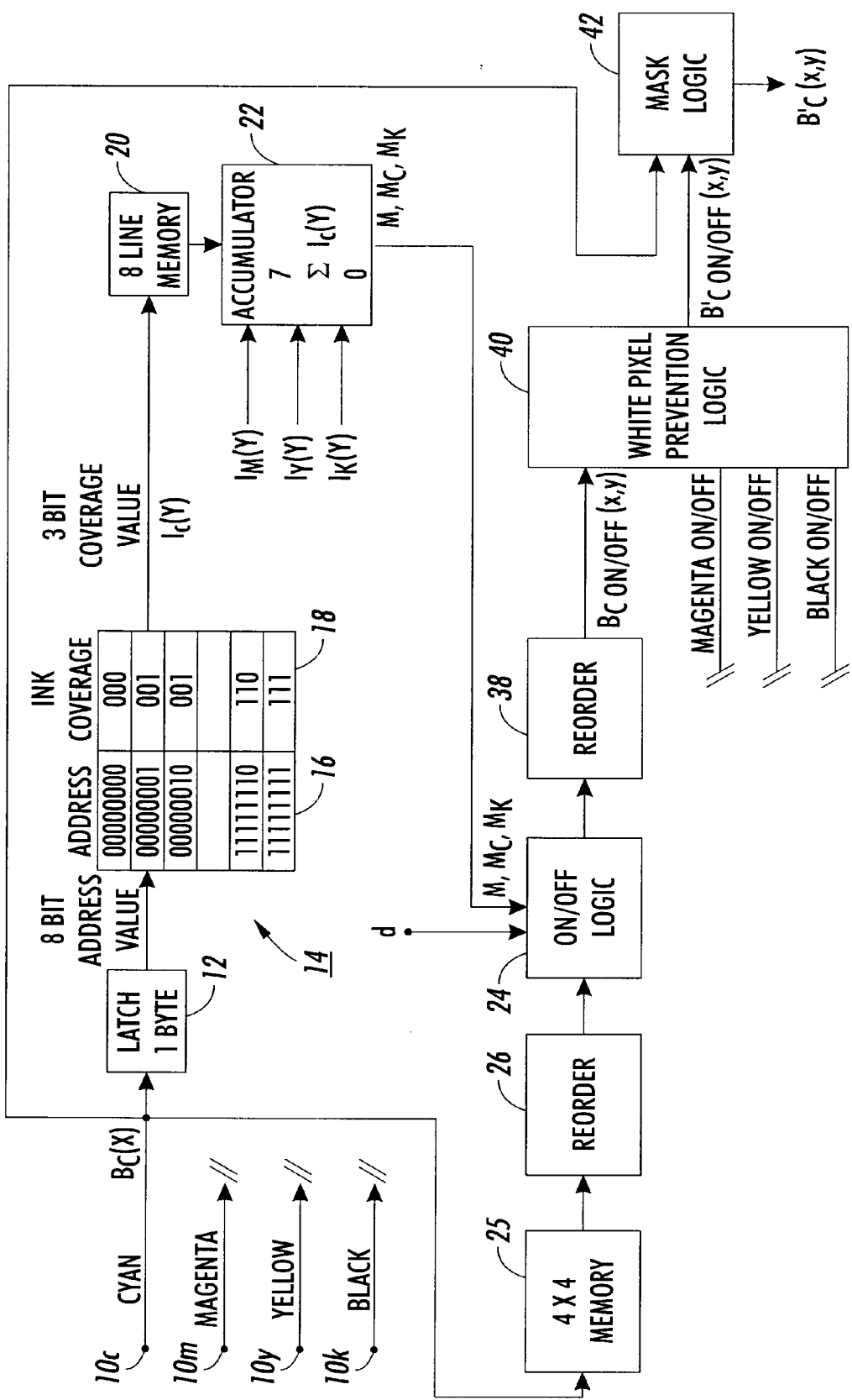
FIG. 1 is a functional block diagram of a system for carrying out the present invention.

A basic functional block diagram for a system for carrying out the present invention is shown in FIG. 1. As shown therein, a plurality of video inputs 10c, 10y, 10m, and 10k, each representing one of the cyan, magenta, yellow or black separations, respectively (B N (x,y)) of image B(x,y) are directed into the ink coverage reduction system. However, although FIG. 1 shows the bitmap for the black color separation being processed, it is important to note that according to the present invention, the black color separation is passed unchanged through the coverage reduction process. This aspect of the invention will become clear in reference to the further Figures, described in more detail below. Because the process of the system is mostly redundant for each separation, initially only the cyan bitmap B C (x,y) will be described. Bitmap B C (x,y) is a binary bitmap in this system, defined along the fast scan (x-axis) and slow scan (y-axis) axes, describing the image in terms of 1 bit pixels arrayed in scan lines. Each pixel is an image signal, which may be said to have a condition or image state, which describes for a binary pixel whether a print dot will be made at the output or not. This may also be equated to whether the pixel is ON or OFF, i.e., 1 or 0. Thus, there are two image states for any pixel in a binary printer. For a multilevel printer, there may be more than two pixel values, and a similarly larger number of pixel image states.

To determine ink coverage over a given area, bitmap B C (x,y) is directed initially to a one byte (8 bit) latch 12, which stores eight one bit pixel values in order 1 to 8. This 8 bit stored binary string, which represents the bitmap image in an 8 pixel×1 scan line portion of the given area, is used as an address to access a 256 entry look up table (LUT) 14. The data stored at each of addresses 16 in the look up table 14 represents ink coverage values 18, for the 8 pixel area stored at latch 12. It will no doubt be appreciated that many of these ink coverage values are the same, as shown by the demonstration of address 00000001 and address 00000010, which each have ink coverage values of 1. Should ink coverage be non-linear in character, because, for example, the ink jet device tends to deposit more or less ink when operated in certain image formations, then such non-linearity may be accounted for in loading the LUT 14 values.

Ink coverage values 18, which in the example can be represented by 3 bit binary values, now form a signal or function I C (x,y), representing predicted ink coverage in an 8 pixel×1 scan line. A group of these values, stored in 8 row memory 20, are summed together at accumulator 22 to derive total ink coverage over a given area, in this case, 8 pixels×8 scan lines in size. The output of accumulator 22 is a value p, the predicted or measured ink coverage value for each separation of the given area of the image. The values of p ($p_c$, $p_m$, $p_y$, $p_k$), measured for each of the cyan, magenta, yellow and black separation bitmaps, are added to derive values m=$p_c$+$p_m$+$p_y$+$p_k$, mc=$p_c$+$p_m$+$p_y$ and $m_k$=$p_k$, which are the predicted or measured ink coverage value for the given area of the image. Here, m is the total predicted or measured ink coverage value for all of the color separations; m. is the predicted or measured ink coverage value for the colored separations cyan, magenta and yellow; and $m_k$ is the predicted or measured ink coverage value for the black separation. Thus, m=$m_c$+$m_k$. It is possible that some colors bleed more than others; if so, some separations might be weighted more heavily in the summation in embodiments of the present invention.

An 8 pixel by 8 scan line block for the given area has been selected for processing convenience, and because it reflects a useful size for the ink reduction determination. If the area is too large, the ink coverage variations will be averaged in the reduction determination, giving low ink coverage indications when portions within the large area exceed the maximum desirable ink coverage. The choice of area or window size is a compromise between the precision with which coverage can be measured (the larger the area the more possible ink coverage levels) and the accuracy of its measurement. One way of increasing the precision without reducing the locality is to use a weighted sum (more heavily weighting the center) to find the coverage near the center of the window. This would work best for finding the coverage in the neighborhood of a single pixel. In this embodiment, coverage was determined using an unweighted average over the 8×8 area, as it is less expensive to compute. Finally, there is very little difference between using an 8×8 window and, for example a 6×6 window. Of course, many possible areas of different sizes can be used. The 8×8 window allows for greater efficiency of implementation as it uses complete bytes. Computing coverage in an 8×8 window, always aligned on a 4 bit boundary can be done efficiently using small tables. When the window is byte-aligned, a 256 entry table may be indexed by the contents of the scanline covered by the window, for each scanline in the window, summing the results; when it is not byte-aligned, two 16-element tables for may be indexed for each scanline, to compute:

$$cl(p1\&Oxf)+cr(p2>>4),$$

where p1 and p2 are the values in the image beneath the window; and cl and cr are appropriately initialized tables having 16 entries giving bit counts.

This expression refers to the use of the low order four bits of p1 to index into table cl, and the high order bits of p2 are used to index into table cr.

Values m, $m_c$, and $m_k$ are used at ON/OFF logic 24 to apply the turn off ratio to each separation of the image except for the black separation. Here, the desired turn off ratio is represented generally by d/m, where d represents the maximum desired number of pixels ON in an area, m represents the predicted or measured total ink coverage value, and d/m therefore represent ratio reflecting that d pixels out of every m pixels in the separation bitmap should be left on. However, as described above, in the present invention the black separation is passed through the coverage reduction phase (turn off logic) unchanged. Thus, based on the measured values of m, $m_c$, and $m_k$, computed above, it is apparent that the portion of d corresponding to the black separation, i.e., $d_k$, must be left equal to $m_k$. Thus, the portion of d corresponding to the remaining color separations (cyan, magenta and yellow), which will be represented by $d_c$, will be the remaining part of d, and can be represented as $d_c = d - d_k = d - m_k$.

In the color depletion phase, the turn off logic operates on the color separations (i.e., all of the separations except for black) to turn off pixels to effect coverage reduction. Although the following description is generic to any color separation, it is important to note that only the cyan, magenta, and yellow separations are processed. Thus, in a given print operation, the turn off logic 24 accepts two input values. The value d is the desired print coverage, which can be fixed for a given printer, or can be varied (either by input or hardware change) based on particular combinations of inks, paper types, and printing applications. The second input, or set of inputs, is m, $m_c$, and $m_k$, as described above. Because the black color separation is passed unchanged through the turn off logic, the total number of pixels left ON after processing the portion of the image can be represented as $d_c/m_c$.

In embodiments of the present invention, it may be convenient to compare the appropriate ratios d/m to 1, where a ratio greater than 1 indicates no need to turn off any pixels. It will be assumed hereinafter that such a comparison has taken place and has indicated a value of d/m less than 1, indicating that at least some of the pixels need to be turned OFF. In one implementation, ON/OFF logic 24 may include a counter, which counts from 0 to $m_c$ by increments of $d_c$ for each pixel on in B C (x,y). Upon reaching or exceeding $m_c$, an output representing an ON signal is produced, to indicate that the current pixel should be left on. This will be further illustrated hereinafter.

There are many possible ways to determine ink coverage for an image, and particularly for binary printers. For binary printers, the presence or absence of a print dot in each separation can be taken as a predicted amount of ink. By summing all the print dots in an area small enough to be useful in the ink reduction determination, a predicted value of ink coverage can be made. In a multilevel or gray level printer, the measured amount of ink is a function of the gray level value of the pixel, or the percentage of the maximum ink value deposited at a pixel in the image.

The requirement that regions that need no change receive no change is met by never turning ON pixels that were originally OFF, and only turning OFF pixels where the coverage is too high.

Figure 2:
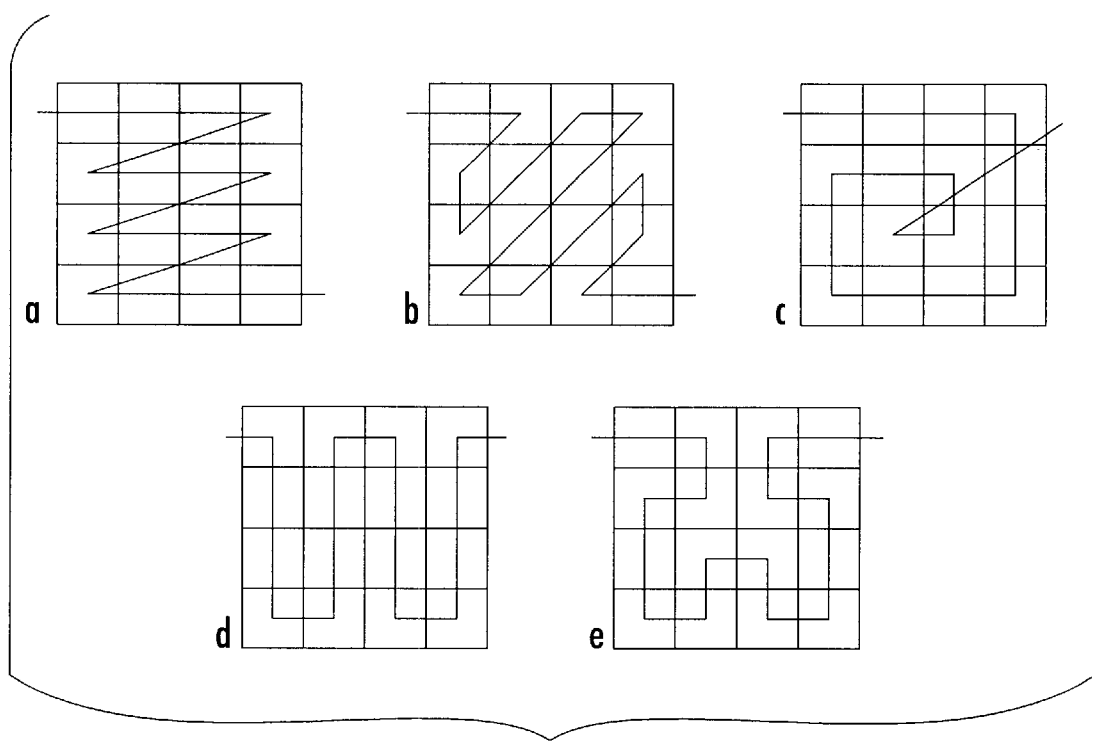
FIG. 2 is an example of the processing pattern.

As applied to cyan bitmap B C (x,y), the "turn OFF ratio" or ON/OFF ratio of d/m (or $d_c/m_c$) would result in a periodic pattern, which, when imposed on a halftone pattern probably existing in B C (x,y), would result in undesirable moire patterns in the reproduction of the image. Accordingly, one method of alleviating this problem is to randomize the application of the turn OFF ratio to the bitmap. However, it is also desirable that the determination of ON/OFF be made with knowledge of the determination for adjacent pixels, so that the application of the turn OFF ratio can be applied uniformly through the given area. Accordingly, and with reference to FIGS. 2a–e, where FIG. 2a shows the usual method of progressing through a bitmap, processing pixels 1 to n, from scan line 1 to scan line k, FIGS. 2b–e show other processing orders (shown for only 4×4 areas, as will be explained below), with a preferred processing order being the area filling curve of FIG. 2e. It will no doubt be appreciated that other processing orders are possible, which process pixels in an order that is relatively random with respect to common halftone patterns, and retains dependence on adjacent pixels. Ordering of pixels is accomplished by storing a 4×4 set of pixels for which m has been determined in memory 25, and subsequently reading the values of B C (x,y) out of memory with processing order control 26, which reorders pixels of B C (x,y) in accordance with the selected pixel order function.

Once the turn OFF ratio $d_c/m_c$ for an 8×8 set of pixels is determined, that ratio is applied to a 4×4 pixel grouping therewithin, processed in accordance with the process ordering of FIGS. 2b–e. The use of an 8×8 area for determining the turn OFF ratio smoothes abrupt changes, which might occur if a smaller area is used for that determination.

At ON/OFF logic 24, a logical process is employed implementing the determined turn OFF ratio. The fraction of pixels to be left ON is the ratio of the desired coverage to the measured coverage. This can be exactly retained as a rational number, d/m. A simple logic process ensuring that d of every m pixels are turned on is:

f=0 for each pixel
f=f+$d_c/m_c$ if(f≧1) turn on this pixel
f=f−1
Next pixel

Where f, initially set to zero, is the (fractional) number of pixels that should have been turned on since the last one was turned on, or alternatively the fraction of the way to the next pixel that should be turned on.

Pixels are spaced as uniformly as possible along the path that gives the order in which they are visited. If the control variable f is initialized only at the start of the page, and not in each window, the average over a larger region will be correct. By scaling f by $m_c$, the use of non-integer values is eliminated:

f=0 for each pixel
f=f+$d_c$ if(f≧$m_c$) turn on this pixel
f=f−1
Next pixel

The initial setting of f to zero is arbitrary, as over an entire image the initial value of f is of no consequence. To reduce inter-separation correlations it may be advantageous to use various values between 0 and $m_c$ for the initial settings of the control variable f for different separations. The comparison with mc is also arbitrary, for the same reason. If the comparison is with 0 it may be more efficient and can be accomplished without changing the result in any way by subtracting $m_c$ from the initial value of f:

f=−$m_c$ for each pixel
f=f+$d_c$ if(f≧0) turn on this pixel
f=f−1
Next pixel

It will be noted that this logic is similar to Bresenham's algorithm for drawing lines, which for computer graphics determines the distance along a first axis, before a step must be made in the second axis for a line extending in two axes.

At block 38, the function is reordered into the original image order as B C ON/OFF (x,y), which is a mask representing the turn OFF function. At block 40, white pixel prevention logic is provided, to prevent the occurrence of a corresponding pixel in every separation from being turned OFF, which might allow white or background show through. Assuming 100% coverage is acceptable, totally white pixels should not be introduced into the image. Thus, if a full color pixel has 200% coverage, and a pixel in one separation is turned OFF, the corresponding pixels in other separations should not all be turned OFF when that pixel is visited for the other separation:

fc=0
fm=m/4
fy=m/2
fk=3m/4
calculate the pixelwise coverage for each pixel/separation pair, in some order
if this pixel is ON in this separation fsep=fsep+d
if(fsep≧m) or the coverage in this pixel is 1 turn ON this pixel
fsep=fsep-m else
turn OFF this pixel
decrement the coverage in this pixel by 1

Accordingly, a set of ON/OFF conditions is created for a 4×4 area of the image, reducing the number of ON pixels in that area in accordance with the determining turn OFF ratio, B' C ON/OFF (x,y). This set of values is then used as an input to a masking logic 42, which uses B' C ON/OFF (x,y) in altering the bitmap B C (x,y) at block 42 from which the now adjusted image B' C (x,y) is directed to the printer controller.

Figure 3:
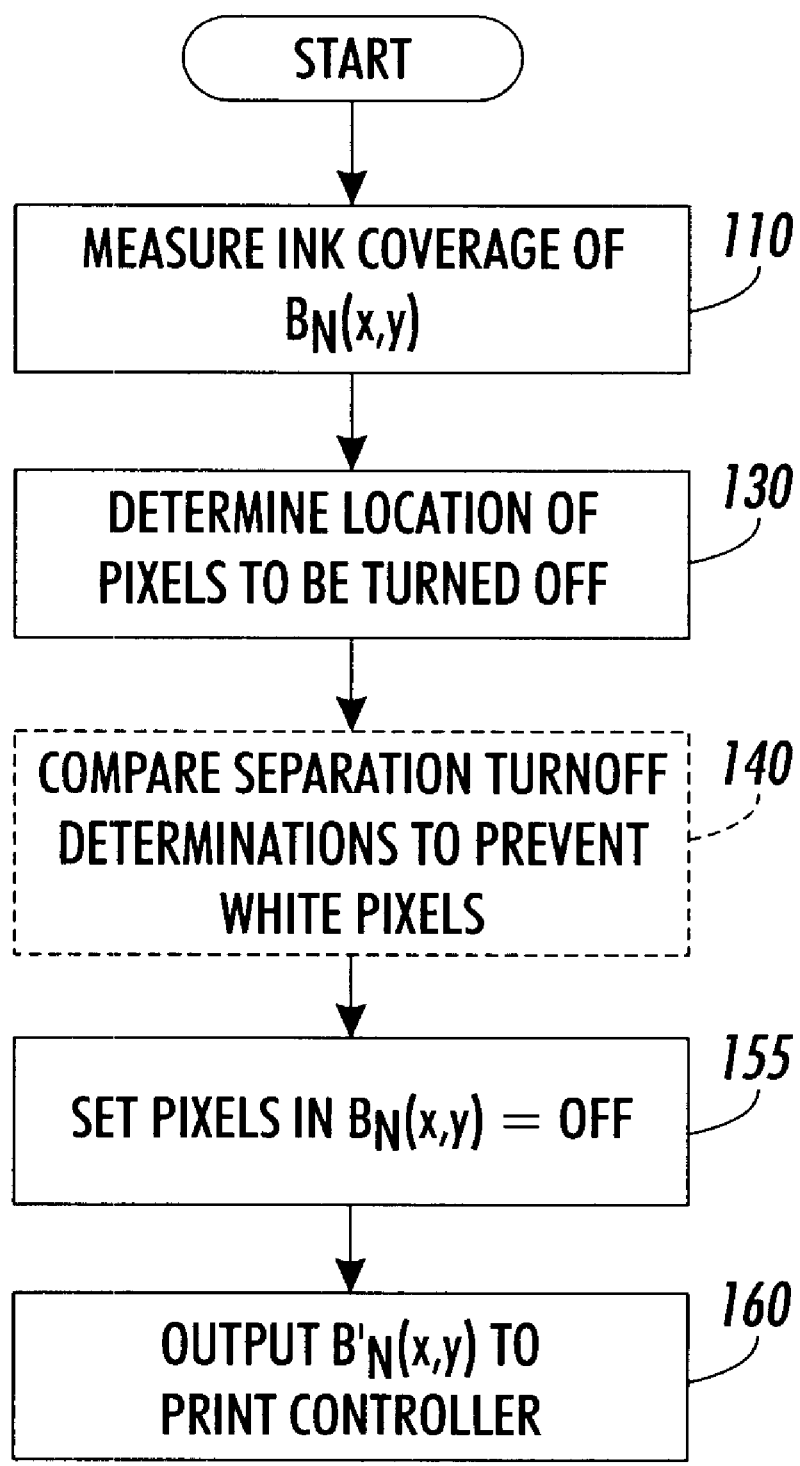
FIG. 3 shows a flow chart demonstrating the overall inventive method.

FIG. 3 presents the process steps in the described embodiment. In step S110, the potential ink coverage in separation N of B(x,y) is measured. In Step S130, the location in the image of pixels that should be turned OFF is determined in accordance with the turn OFF ratio. Step S140 compares each separation with the others to prevent corresponding pixels in each separation from being all turned OFF. Next, step S155 sets pixels in the separation of B(x,y) OFF. Finally, in step S160, the adjusted image is output to a print controller.

Figure 4:
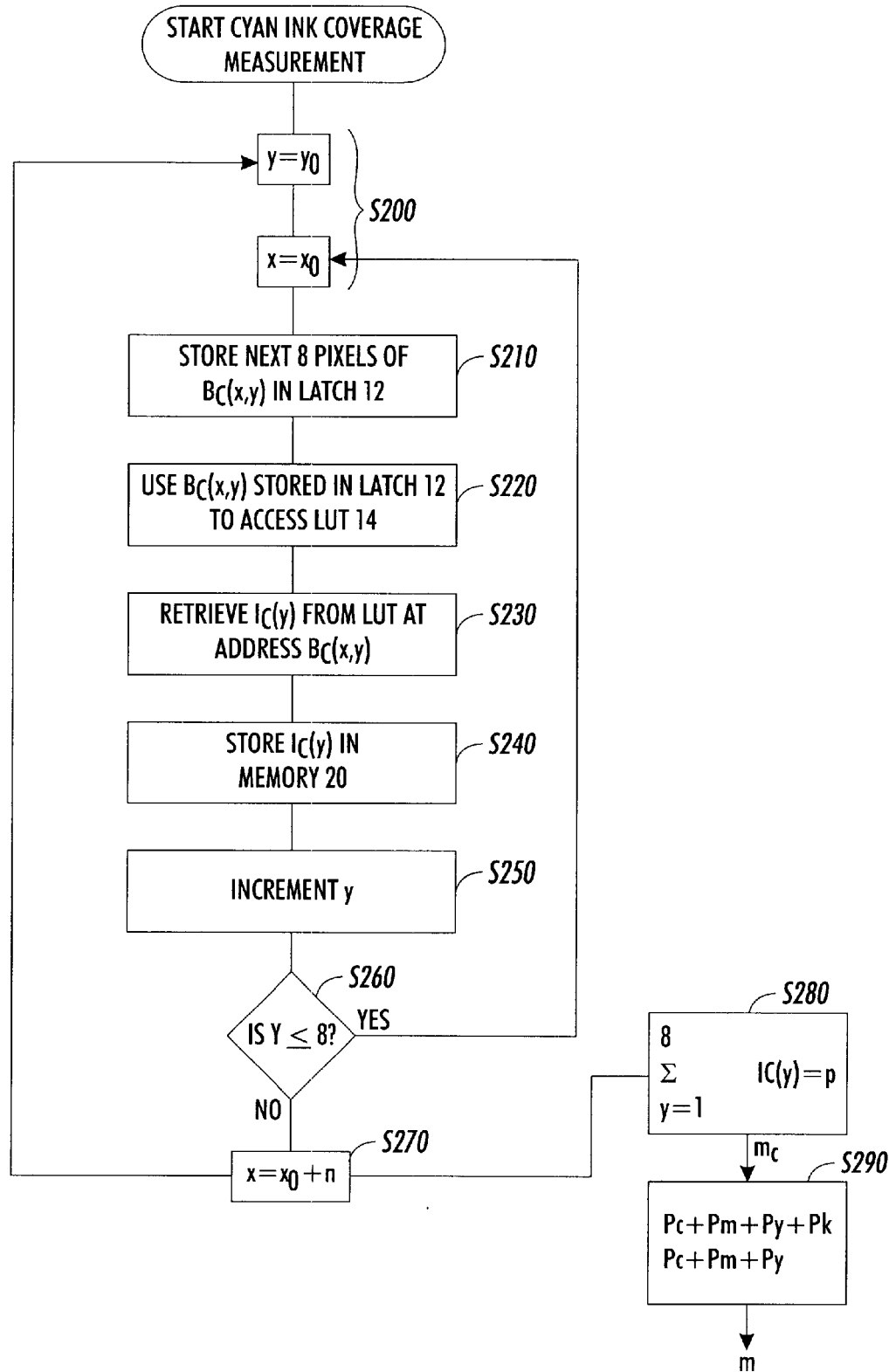
FIG. 4 shows a flow chart of the method of determining ink coverage.

FIG. 4 demonstrates a flow chart for a single pass across an image, ignoring image edges, in which the method of ink coverage measurement is conducted. This flow chart is demonstrated for the cyan bitmap B C (x,y), but it will be understood that the process is the same for the other color bitmaps. First, at step S200, the scan line and pixel values are initialized to a starting value (here, 0) for the cyan bitmap B C (x,y). At step S210, a first subset of pixels (here, n) from a first scan line at latch 12 is stored. Step S220 shows using the stored n bit value to access a memory location in LUT 14. An ink coverage value I C (y) is retrieved at step S230 for the set of pixels, which value I C (y) is stored in step S240 in memory 20. At step S250, the scan line value is incremented so that the process may be repeated for the next subset of pixels from a second scan line. If a desired area of coverage, here an 8 scan line region, has been examined, the test of step S260 is met, the scan line value is reset to 0 and at step S270, the pixel value is set for the next subset of pixels in each scan line. If the test at step S260 is met, the ink coverage value p for the 8×8 area in the separation is determined by a standard summing function, indicated by the equation of step S280. At step S290, $p_c$, $p_m$, $p_y$, and $p_k$ are summed to derive a value of m for the given area of the image, and the values $p_c$, $p_m$, and $p_y$ are summed to derive a value of $m_c$ for the given area of the image.

Figure 5:
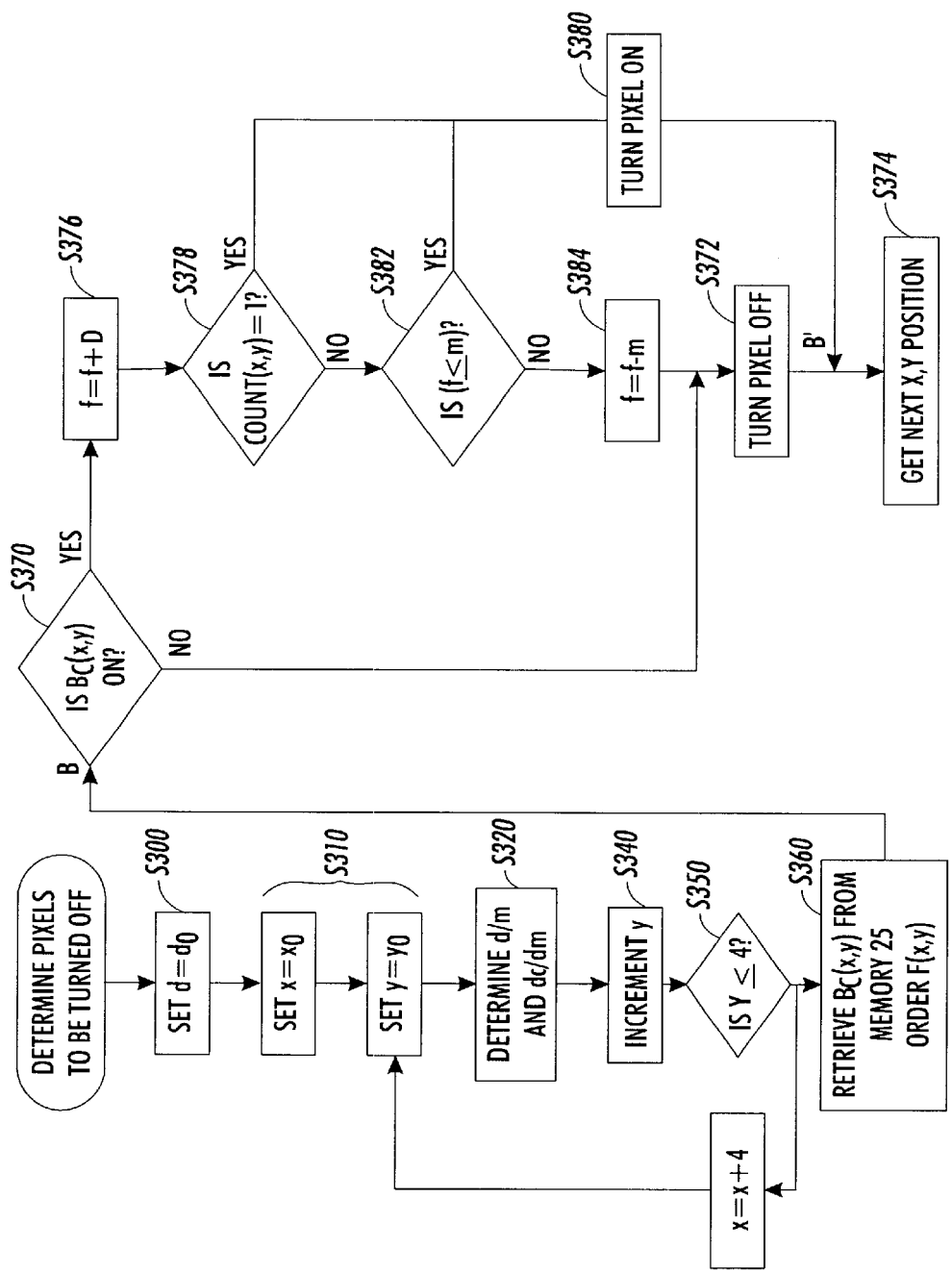
FIG. 5 shows a flow chart of the method of determining whether a pixel should be designated as OFF.

FIG. 5, shows, as before, a flow chart for a single pass across an image, ignoring image edges, to demonstrate the pixel ON/OFF determination. The determination process includes a first step S300 in which d is set, probably entered by a user of the system as required by the combination of ink and material. At step S310, the scan line and pixel values are initialized to starting values (here, 0). Next, at step S320, m, $m_c$, and $m_k$ are determined for a particular 4×4 subarea within the 8×8 area for which m, $m_c$, and $m_k$ were determined, using the ink coverage measurement m determined by the method described with respect to FIG. 4. Steps S340 and S350 together store the pixel values of B C (x,y) in a memory 25. At step S360 pixels are read out of memory 25 by reorder processor 26 in order F C (x,y), to avoid moiré. F C (x,y) may vary from separation to separation, if required to avoid moiré.

In FIG. 5, white pixel prevention logic is combined with the ON/OFF logic. At step S370, bitmap B C (x,y) is examined to determine whether the current pixel is ON or OFF. If it is OFF, the pixel remains OFF (step S372), and the next pixel is processed (step S374). If bitmap B C (x,y) is examined at step S370 and the current pixel is ON, at step S376, f is incremented by the value $d_c$. At step S378, the "count" is compared to 1. The count represents a running sum of other separations that are turned ON at the current x,y position. If the count equals 1, then only the current separation is turned ON, and accordingly, to avoid a white space, the current pixel should be turned ON at step S380. If the count is greater than 1, then there will be no white space occurring anyway. At step S382, f is compared to m. If f is less than or equal to m, then the pixels remains ON, at step S380. If f is not less than or equal to m, then f is decremented by m at step S384, and the pixel is turned OFF at step S372.

Figure 6:
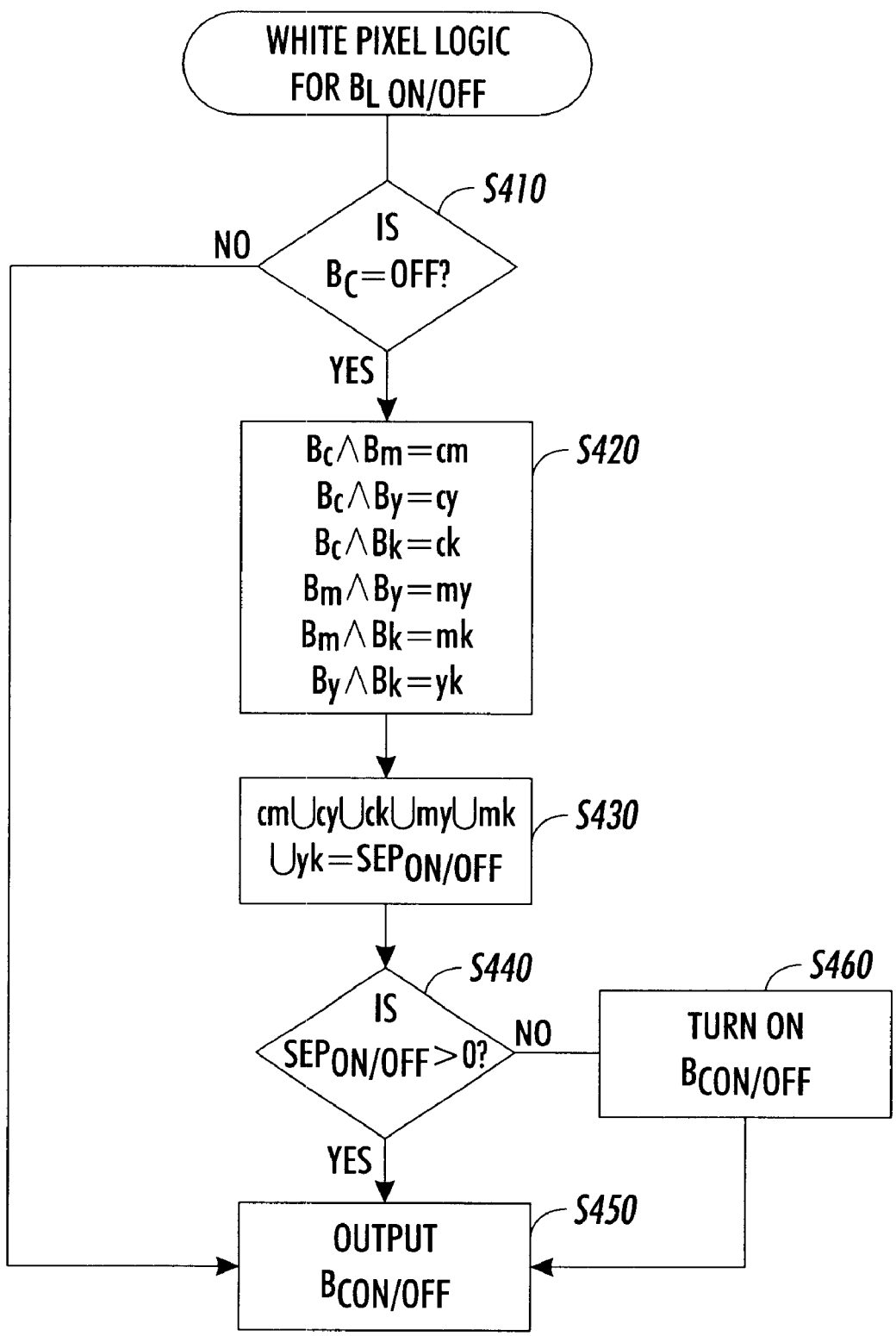
FIG. 6 shows the separate step of the method of white pixel prevention.

Alternatively, white pixel prevention logic need not be combined with the ON/OFF logic. Such an embodiment is demonstrated in FIG. 6, which shows a flow chart showing separate white pixel prevention logic. In FIG. 6, if B C ON/OFF (x,y) is OFF (step S410), then each separation turn off function B N ON/OFF (x,y) (represented for the purpose of this figure as B c, B m, B y, and B k) is ANDed with the others (step S420) to derive cm, cy, ck, my, ink, yk, which are then ORed together to derive a determination SEP ON/OFF. If SEP ON/OFF is greater than 0 (Step S440), then at least one of the separations is to be turned ON, and no action is required. B C ON/OFF (x,y) is directed to an output at step S450. However if SEP ON/OFF is equal to 0 (Step S440), then B ON/OFF (x,y) is turned ON. This is a rather simplistic solution, since undoubtedly, the choice of separation that is turned ON in white pixel prevention should be alternated among the separations that were turned OFF. Otherwise, if, for example, the cyan separation is always processed first, then the image may be skewed with a greater amount of cyan than desired.

While the present invention is demonstrated with the above embodiment, there is no doubt many others accomplish the invention. The important aspects of the invention are that ink coverage can be measured by reference to the bitmap of the image, and that by a comparison of measured ink coverage with desired ink coverage, an ON/OFF ratio can be determined and applied to the pixels in the color separations of the image, retaining the black color separation unchanged, to reduce ink coverage. Preferably, the determination is made in a manner that minimizes moire, and preferably, makes the determination of OFF or ON in any single separation with knowledge about the state of the corresponding pixels in other separations. The present description assumes a binary or bilevel ink jet printer, but there is no reason in principle that the invention would not apply to a gray or other multilevel printer, where ink coverage is a function not only of the presence of a print dot, but also the gray level value of the print dot. Other printing processes that are printed on a pixel by pixel basis also have problems with excessive marking material, and may benefit from the described method of reduced marking material use. Notably, electrophotographic and ionographic printing methods using a pixel by pixel printing process for forming a latent image for development with dry or liquid toner marking materials, can suffer from excessive marking material, evidenced by sheet cockling and curling caused by differential shrinkage of toner and paper in the printing process. Thus, although the present invention has been described with reference to an ink jet printing system, there is no reason that the present invention can not be applied to such other printing processes, and application of the present invention in such non-ink jet printing processes is fully within the scope of the present invention.

An advantage of the present invention is that the resultant image more closely matches the original image being processed. In usual coverage reduction techniques, such as that disclosed in U.S. Pat. No. 5,515,479, all of the color separations are processed to reduce marking material used by all of the separations. Thus, once the desired amount of marking material, d, is determined, all of the color separations, including the black color separations, are reduced by the reduction ratio d/m. In this manner, the reduction ratio applied to all of the separations is the same. However, according to the present invention, the reduction ratio of black is set to one, and a smaller reduction ratio is applied to the remaining color separations. Thus, the ratio of any color separation to black is allowed to float (depending on the relative weighting of black in the image), while the ratios of other color separations to each other is maintained constant. It has been found that this process results in more realistic color rendition, providing resultant images without color shift problems.

As will be apparent to one of ordinary skill in the art, numerous changes, alterations and adjustments can be made to the above-described embodiments without departing from the scope of the invention, and the invention is in no way limited to the specific exemplary embodiments described above. One skilled in the art will recognize that the various aspects of the invention discussed above may be selected and adjusted as necessary to achieve specific results for a particular printer application. Thus, the foregoing embodiments are intended to illustrate and not limit the present invention. It will be apparent that various modifications can be made without departing from the spirit and scope of the invention.

What is claimed is:

1. A method for processing a color image for printing to reduce an amount of marking material used therefor, the color image comprised of multiple separations, comprising at least one non-black color separation and a black color separation, each defined by a bitmap of single bit pixels each having a pixel value and arranged in an array of scan lines, said method comprising the steps of:

for each separation bitmap, measuring a marking material coverage value over a given area within the image;

summing the marking material coverage of each separation bitmap to determine measured marking material coverage;

comparing desired marking material coverage with measured total marking material coverage to derive an ON/OFF ratio, where the ON/OFF ratio represents a number of pixels to be turned OFF, compared to the number of pixels ON in a separation;

setting a number of pixels to OFF in the non-black color separation bitmaps, in a larger number of pixels in said separation, in accordance with the turn OFF ratio;

retaining an ON/OFF state of all of the pixels in the black color separation irrespective of the ON/OFF ratio; and outputting the separation bitmaps to a print controller.

2. The method as defined in claim 1, wherein the step of measuring marking material coverage comprises the steps of:

directing pixel values of a set of k pixels from a single scan line of pixels into a latch, where k is an integer number of pixels;

providing a pre-loaded look up table, having a set of k bit addresses, each address corresponding to data entries including a possible combination of marking material coverage values for a set of k pixels;

storing to a memory, the marking material coverage values from the look up table corresponding to each set of k pixel values for a set of e scan lines; and summing for the image, the marking material coverage values for each separation over the area of a set of k pixel values in a set of e scan lines.

3. The method as defined in claim 1, wherein the step of setting a number of pixels to OFF in the bitmap, in a larger number of pixels in the non-black color separation in accordance with the turn OFF ratio comprises the steps of:

incrementing a counter value by a predetermined amount related to the OFF/ON ratio, whereby increasing the counter value increases the likelihood of the pixel being set OFF;

comparing the counter value with a reference to determine whether to set the pixel OFF;

upon determining that a pixel should be turned OFF, resetting the counter so that the next pixel has a decreased probability of being turned OFF; and performing a masking process between the pixel value and the ON/OFF determination to generate the separation bitmap.

4. The method as defined in claim 1, wherein the step of comparing desired marking material coverage with measured marking material coverage to derive a turn OFF ratio, where the turn OFF ratio represents a number of pixels to be turned OFF, in a larger number of pixels in a separation further comprises the step of determining the location in the image of pixels that should be turned off in accordance with the turn off ratio.

5. The method as defined in claim 4, wherein the step of determining the location in the image of pixels that should be turned off in accordance with the turn off ratio further comprises the step of processing the pixels within the given area in a predetermined order.

6. The method as defined in claim 5, wherein the predetermined order corresponds to the path of a space filling function through each pixel in the given area.

7. The method as defined in claim 4, wherein the step of determining the location in the image of pixels that should be turned OFF in accordance with the turn off ratio further comprises the step of comparing the state of corresponding pixels in each separation bitmap and upon detection of a concurrence of pixels turned OFF, turning at least one pixel from said corresponding pixels, ON.

8. A method for processing a color image for printing by an ink jet printer to reduce ink used thereby, the color image comprised of multiple separations, comprising at least one non-black color separation and a black color separation, each defined by a bitmap of single bit pixels each having a pixel value and arranged in an array of scan lines, comprising the steps of:

for each separation bitmap, measuring an ink coverage value over a given area within the image and summing the ink coverage of each bitmap to determine total ink coverage;

comparing desired ink coverage with measured total ink coverage to derive an ON/OFF ratio, where the ON/OFF ratio represents a number of pixels to be turned OFF, compared to the number of pixels ON in a separation;

setting a number of pixels to OFF in the non-black color separation bitmaps in a larger number of pixels in a separation, in accordance with the turn OFF ratio;

retaining an ON/OFF state of all of the pixels in the black color separation irrespective of the ON/OFF ratio; and outputting the separation bitmaps to a print controller.

9. The method as defined in claim 8, wherein the step of measuring ink coverage comprises the steps of:

directing pixel values of a set of k pixels from a single scan line of pixels into a latch, where k is an integer number of pixels;

providing a pre-loaded look up table, having a set of k bit addresses, each address corresponding to data entries including a possible combination of ink coverage values for a set of k pixels;

storing to a memory, the ink coverage values from the look up table corresponding to each set of k pixel values for a set of 1 scan lines; and summing for the image, the ink coverage values for each separation over the area of a set of k pixel values in a set of 1 scan lines.

10. The method as defined in claim 8, wherein the step of setting a number of pixels to OFF in the bitmap, irrespective of their state, in a larger number of pixels in the non-black color separation in accordance with the turn OFF ratio comprises the steps of:

incrementing a counter value by a predetermined amount related to the OFF/ON ratio, whereby increasing the counter value increases the likelihood of the pixel being set OFF;

comparing the counter value with a reference to determine whether to set the pixel OFF;

upon determining that a pixel should be turned OFF, resetting the counter so that the next pixel has a decreased probability of being turned OFF; and performing a masking process between the pixel value and the ON/OFF determination to generate the separation bitmap.

11. The method as defined in claim 8, wherein the step of comparing desired ink coverage with measured ink coverage to derive a turn OFF ratio, where the turn OFF ratio represents a number of pixels to be turned OFF, in a larger number of pixels in a separation further comprises the step of determining the location in the image of pixels that should be turned off in accordance with the turn off ratio.

12. The method as defined in claim 11, wherein the step of determining the location in the image of pixels that should be turned off in accordance with the turn off ratio comprises the step of processing the pixels within the given area in a predetermined order.

13. The method as defined in claim 12, wherein the predetermined order corresponds to the path of a space filling function through each pixel in the given area.

14. The method as defined in claim 11, wherein the step of determining the location in the image of pixels that should be turned OFF in accordance with the turn off ratio further comprises the step of comparing the state of corresponding pixels in each separation bitmap and upon detection of a concurrence of pixels turned OFF, turning at lease one pixel from said corresponding pixels, ON.

15. A method for processing a color image for printing, to reduce an amount of marking material used thereby, the color image comprised of multiple separations, comprising at least one non-black color separation and a black color separation, each defined by a bitmap of single bit pixels each having a pixel value and arranged in an array of scan lines, comprising the steps of:

receiving pixel values of a set of k pixels from a single scan line of pixels, where k is an integer number of pixels;

providing a pre-loaded look up table, having a set of k bit addresses, each address corresponding to data entries including a possible combination of marking material coverage values for a set of k pixels;

storing to a memory, the marking material coverage value from the look up table corresponding to each set of k pixel values for a set of 1 scan lines;

summing the marking material coverage values for the set of 1 scan lines to derive a marking material coverage value for the area of k pixels by 1 scan lines in each separation;

summing the marking material coverage values for the separations to derive a marking material coverage value for the image over an area of k pixels by 1 scan lines;

determining the location in the image of pixels in the non-black color separations that should be turned OFF in accordance with a turn OFF ratio, while retaining unchanged an ON/OFF state of all pixels in the black color separation;

incrementing a counter value by a predetermined amount related to the turn OFF ratio, whereby increasing the counter value increases the likelihood of the pixel being set OFF;

comparing the counter value with a reference to determine whether to set the pixel OFF, said comparing generating an ON/OFF determination signal;

upon determining that a pixel should be turned OFF, resetting the counter so that the next pixel has a decreased probability of being turned OFF;

performing a masking process between the pixel value and the ON/OFF determination signal to generate a separation bitmap; and outputting each separation bitmap to a printer.

16. The method as defined in claim 15, wherein the step of determining the location in the image of pixels that should be turned off in accordance with the turn off ratio comprises the step of processing the pixels within the area in a predetermined order.

17. The method as defined in claim 16, wherein the predetermined order corresponds to the path of a space filling function through each pixel in the area.

18. The method as defined in claim 15, wherein the step of determining the location in the image of pixels that should be turned off in accordance with the turn off ratio further comprises the step of comparing the state of corresponding pixels in each separation bitmap and upon detection of a concurrence of pixels turned OFF, turning at least one pixel from said corresponding pixels ON.

19. A device for processing a color image comprised of multiple separations, comprising at least one non-black color separation and a black color separation, each defined by a bitmap of single bit pixels for printing, to reduce an amount of marking material used in the color image, comprising:

- means for predicting the marking material coverage of an area in an output image as a function of the input image;
- means for determining a ratio of pixels to be turned OFF in the non-black color separations, while retaining unchanged an ON/OFF state of all pixels in the black color separation, as a function of a desired marking material coverage for a page on which the color image is printed and the predicted marking material coverage;
- processing order control means, for determining a sequence of pixels processed in the input image for reducing marking material coverage;
- turn off determining means for determining whether a pixel should be turned OFF in the non-black color separations in accordance with the turn OFF ratio, where each pixel is processed in an order controlled by the process order control means, wherein said turn off determining means does not operate on said black color separation;
- a masking circuit, having as inputs the pixels in each separation of the color image and the turn off ratio determination from said turn off determining means, and having as an output a pixel value for a reduced marking material image; and
- output means for directing the pixel value to a print controller.

20. The device as defined in claim 19, wherein the turn off determining means for determining whether a pixel should be turned OFF in accordance with the turn OFF ratio comprises:

- a counter, maintaining a count value incremented by a predetermined amount related to the turn OFF ratio for each pixel processed, whereby increasing the counter value increases the likelihood of the pixel being set OFF;
- means for comparing the count value with a reference to determine whether to set the pixel OFF; and
- means for resetting the counter so that the next pixel has a decreased probability of being turned OFF.

21. The device as defined in claim 19, wherein the turn off determining means for determining whether a pixel should be turned OFF in accordance with the turn OFF ratio comprises:

- means for comparing the state of corresponding pixels in each separation bitmap and upon detection of a concurrence of pixels turned OFF, turning at least one pixel from said corresponding pixels, ON.

* * * * *